P. J. RIVERS.
DRIVING GEAR FOR AUTOMOBILES.
APPLICATION FILED JULY 29, 1908.
957,626.
Patented May 10, 1910.
3 SHEETS—SHEET 3.
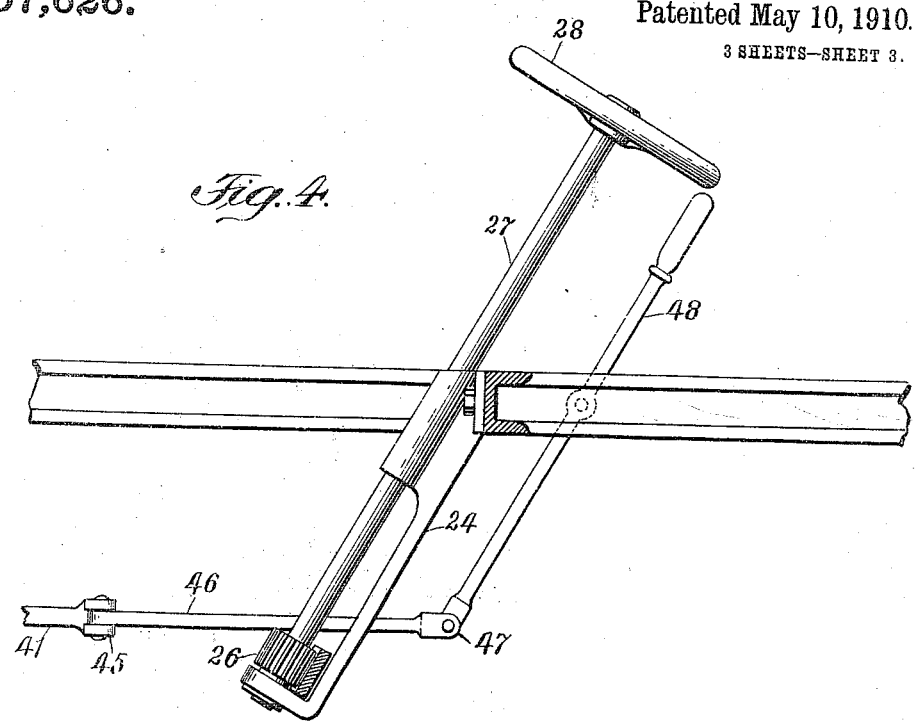
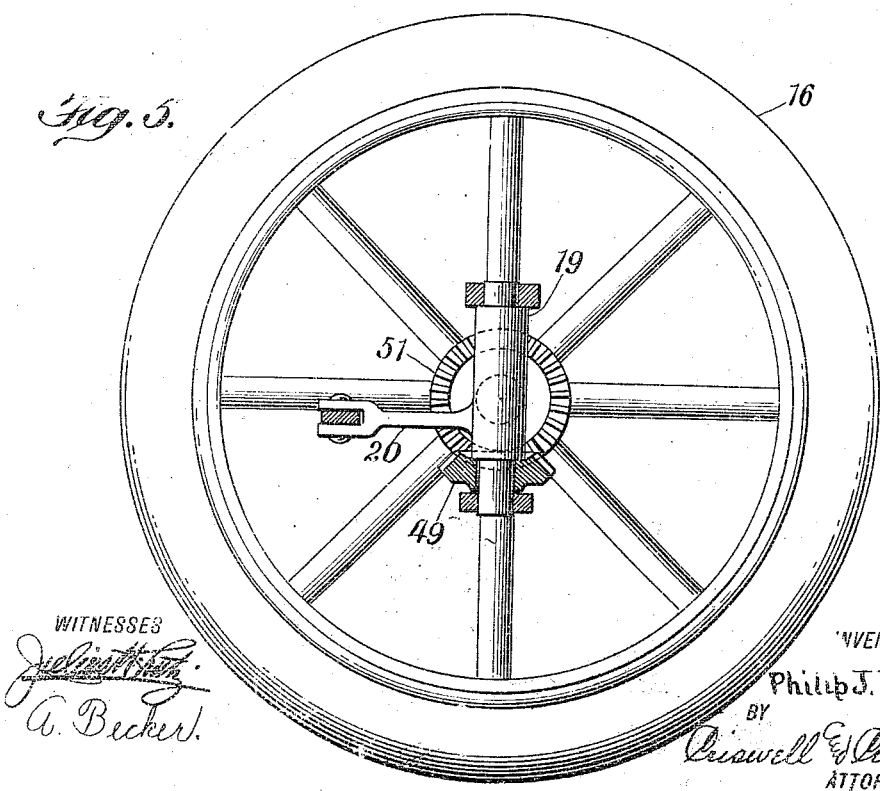
WITNESSES
INVENTOR
Philip J. Rivers
BY
Criswell & Criswell
ATTORNEYS

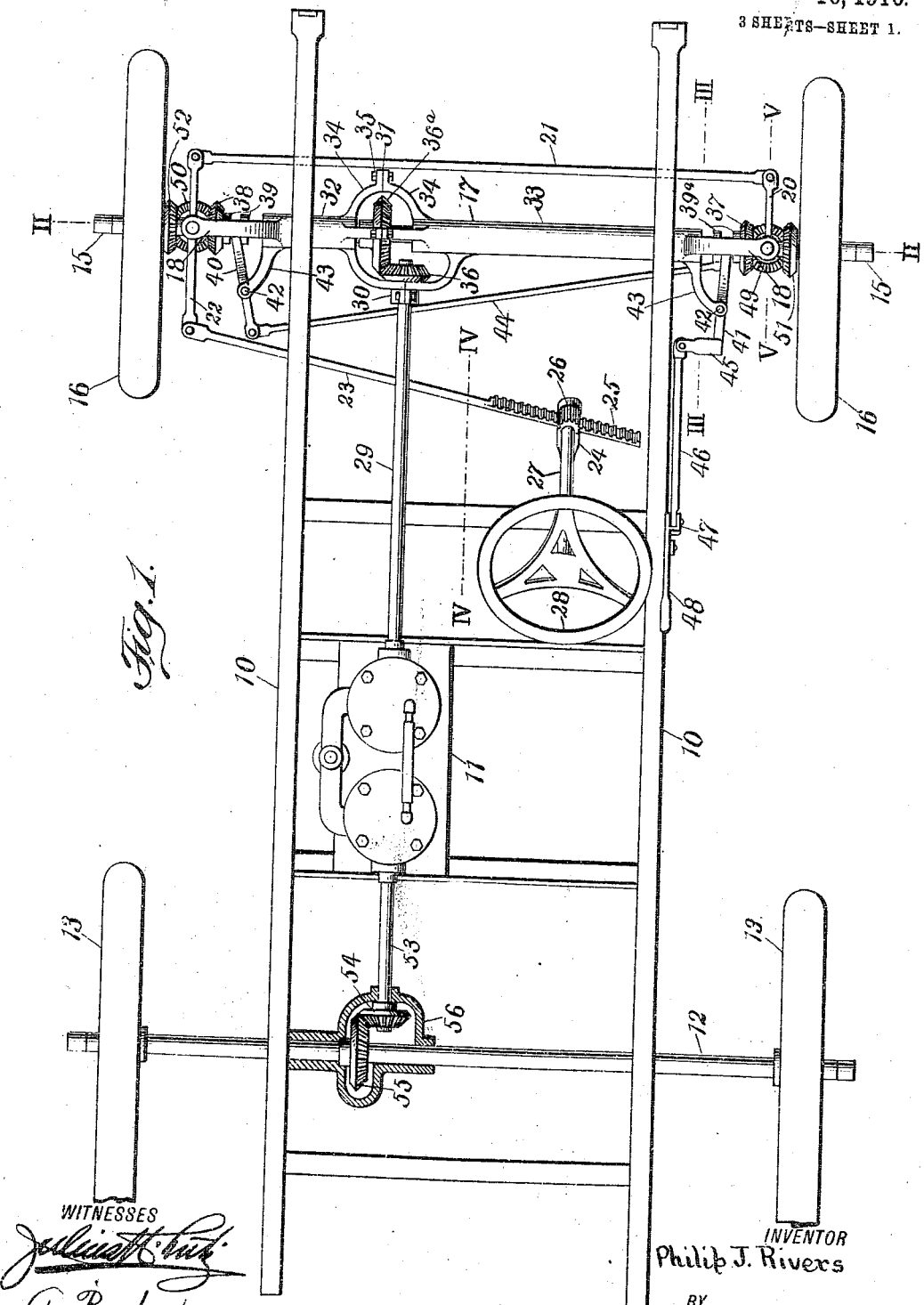

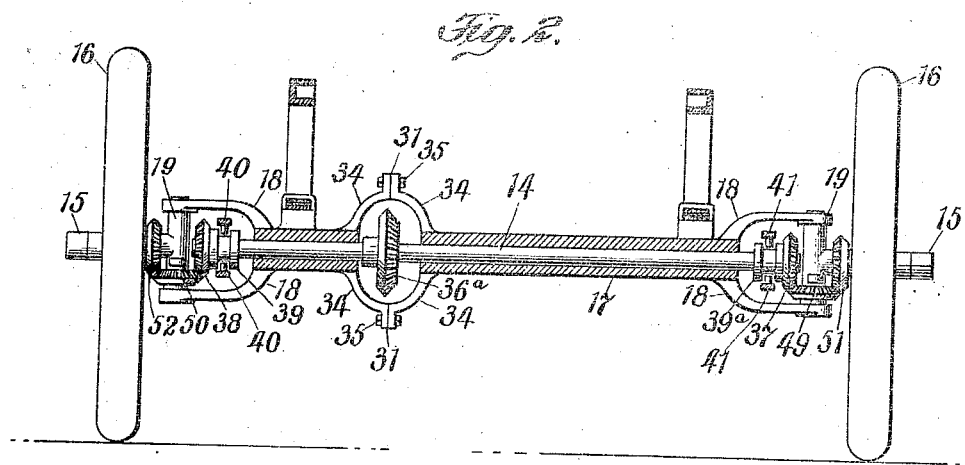

UNITED STATES PATENT OFFICE.

PHILIP J. RIVERS, OF NEW ROCHELLE, NEW YORK.

DRIVING-GEAR FOR AUTOMOBILES.

957,626.

Specification of Letters Patent. Patented May 10, 1910.

Application filed July 29, 1908. Serial No. 445,961.

*To all whom it may concern:*

Be it known that I, PHILIP J. RIVERS, a citizen of the United States, and a resident of New Rochelle, county of Westchester, and State of New York, have invented certain new and useful Improvements in Driving-Gear for Automobiles, of which the following is a full, clear, and exact description.

This invention relates more particularly to mechanism for positively driving the forward axle of automobiles.

The primary object of the invention is to provide simple and effective mechanism whereby the forward wheels of an automobile or vehicle may be positively driven and the wheels moved for steering purposes without at all being interfered with by the driving mechanism, thus increasing the power and effectiveness of the vehicle and preventing the slip resulting from the usual method of driving the rear wheels only, and which invention also serves to reduce the liability of the machine to skid while turning curves.

A further object of the invention is to provide means whereby both the rear and the forward wheels of the vehicle or machine may be positively driven, and to provide driving means whereby the forward wheels may be positively driven or not as desired.

With these and other objects in view, the invention will be hereinafter more particularly described with reference to the accompanying drawings which form a part of this specification, and will then be pointed out in the claims at the end of the description.

In the drawings, Figure 1 is a plan view of one form of vehicle embodying my invention. Fig. 2 is a transverse section, partly in elevation, taken on the line II—II of Fig. 1. Fig. 3 is a fragmentary longitudinal section taken on the line III—III of Fig. 1. Fig. 4 is a fragmentary longitudinal section taken on the line IV—IV of Fig. 1; and Fig. 5 is a fragmentary section taken on the line V—V of Fig. 1.

While I have shown my invention as applied to a particular form of vehicle and supporting frame in which is shown one form of steering mechanism, it will be understood that the invention which applies more particularly to the method of driving the front wheels may be employed with machines and vehicles of various constructions, and independent of, or in combination with the usual or any preferred form of driving mechanism for the rear wheels of the vehicle.

The frame 10 may be of any suitable construction, and may have an engine or other motor 11 mounted thereon in the usual way, and at the rear of the vehicle is the axle 12 to which the rear wheels 13 are held, and at the forward part of the vehicle is the axle 14, and held in alinement with the axle 14 are the short studs or axles 15 of the wheels 16 which are in alinement with the axle 14 and form substantially a continuation thereof though independently movable with relation thereto.

The front axle 14 is held to rotate in the sleeve 17 which is suitably held to the forward part of the frame 10, and has its outer ends forked, as at 18, and in each forked end of the sleeve 17 is arranged a shaft 19 which extends vertically and forms with the stud or axle 15 a substantially T-shaped device. The part 15 of each wheel 16 is held to or formed integral with the shaft 19, and held to each shaft 19 or formed integral therewith is an arm 20 which is connected by a rod 21 so as to move the wheels 16 horizontally and in unison with the shaft 19 forming a pivot. An arm 22 extends outward from one of the shafts or pivots 19, and is connected at its inner end by a rod 23, and this rod 23 has one end guided in a bracket 24, extending downward from the frame and at an angle thereto, and said rod is provided with teeth 25 forming a rack which is in mesh with the pinion 26 carried by the end of a rod or shaft 27 on which is arranged the steering wheel 28. The steering shaft 27 is journaled in the bracket 24, and when rotated will move the rod 23 in either direction, and through the arm 22 and the arm 20 will operate both shafts 19 in unison and thereby simultaneously shift both of the wheels 16 in either direction to properly steer the vehicle.

To drive the forward wheels 16 I provide a drive shaft 29 extending forward from the engine and said shaft is journaled at one end in a part 30 of the sleeve 17. The sleeve 17 is divided transversely thereof, as at 31, to form two members 32 and 33 for the axle 14, and said members 32 and 33 are held together by means of arms or bracket portions 34 which may be bolted together, as at 35, and form a space between the ends of said members. A bevel gear 36 is secured on the end of the shaft 29, and this bevel gear is in mesh with the bevel gear 36ª which is held to the axle 14, and on the outer ends of the axle 14 are slidingly held the gears 37 and 38. The gears 37 and 38 are each provided with a key which is adapted to move in a groove in the end of the axle 14 so as to have a lengthwise movement thereon, but so as to rotate therewith, and the grooved collar 39 of the gear 38 is adapted to be engaged by the forked end of a lever 40, while the grooved collar 39ª of the gear 37 is engaged by the forked end of a lever 41. The levers 40 and 41 are pivoted at 42 to brackets or arms 43 extending from the ends of the sleeve 17, and connected to the outer end of the lever 40 is a rod 44 which is connected at one end to the forked end of the lever 41 so that both levers 40 and 41 may be operated in unison. The lever 41 has its end provided with a bracket 45, and this bracket is connected by a rod or link 46 to the lower end 47 of a hand lever 48. As the lever 48 is moved on its pivot it will cause the link to throw the lever 41 on its pivot to shift the relative positions of the gears 37 and 38, and to cause the same to be disengaged from or to mesh with the gears 49 and 50, the former of which is adapted to mesh with the gear 37 of the forward axle, and the gear 50 with the gear 38. The bevel gears 49 and 50 are independent of the shaft 19 and bracket 18 and are arranged horizontally with the shafts 19 as their axes. A bevel gear 51 is secured to one of the forward wheels 16, and this gear is in mesh with the gear 49, and a bevel gear 52 is in mesh with the gear 50, and is carried by the other forward wheel 16. By having the gears 51 and 52 carried by the wheels 16 and movable about the gears 49 and 50, the said forward wheels may be positively driven no matter in what position the wheels may be placed by the steering mechanism, and by the means shown the said forward wheels may be driven or not according to whether the bevel gears 37 and 38 are in mesh with the gears 49 and 50 respectively.

The forward axle may be driven in connection with the usual or any preferred driving mechanism for the rear axle 12 or independent thereof, and as one means of driving the rear axle, I provide a shaft 53 which is adapted to be operated by the engine or motor 11, and on the end of said shaft 53 may be held a bevel gear 54 which is in mesh with the bevel gear 55 arranged on the axle 12. The end of the shaft 53 and the axle 12 may have a bearing in a suitable bracket 56 or in any other desired way so that as the motor is operated to drive the forward wheels the gears 54 and 55 will serve to positively drive the rear axle 12.

From the foregoing it will be seen that simple and efficient mechanism is provided whereby the forward axle may be positively driven either independently of or in combination with a positively driven rear axle, and in such a way that it will not interfere with the usual steering mechanism for the forward wheel, thus materially saving the wear on the wheel tires, and also materially assisting in the power secured through the motor by reason of overcoming the slip which results when the wheels are not positively driven; that said means serves to prevent the machine from skidding, and that said mechanism may be applied to automobiles as ordinarily constructed.

Having thus described my invention, I claim as new and desire to secure by Letters Patent:—

1. In a vehicle driving mechanism, the combination with a frame, of a forward and a rear axle mounted thereon, a sleeve forming a journal for the forward axle, a wheel pivotally held to each end of the sleeve, means for moving the wheels horizontally on their pivots in unison, a gear carried by each wheel, a second gear slidingly held on each end of the forward axle, intermediate gears connecting the gears on the ends of the forward axle to operate the gears of the wheels in whatever position they are placed by the steering mechanism, levers for moving the gears on the axle inwardly or outwardly, a rod connecting the levers, a hand lever, and means connecting the hand lever to one of the gear operating levers whereby the sliding gears may be operated so that the forward wheels may or may not be positively driven.

2. In a vehicle driving mechanism, the combination with a frame, of a forward and a rear axle mounted thereon, pivotally held vehicle wheels at the forward part of the vehicle, means for moving the wheels in unison, a bevel gear slidingly held on each end of the forward axle, gears meshing therewith for driving the wheels in whatever position they are placed, levers for moving the gears on the axle inwardly or outwardly, a rod connecting the levers, a hand lever, and means connecting the hand lever to one of the gear operating levers whereby the sliding gears may be operated so that the forward wheels may be positively driven.

3. In a vehicle driving mechanism, the combination with a frame, of an axle mounted thereon, a vehicle wheel pivotally held at each end of the axle, a gear slidingly held on each end of the axle, gears connecting the gears on the ends of the axle to operate the wheels in whatever position they are placed, levers for moving the gears on the axle inwardly and outwardly; a rod connecting the levers, and means for operating one of the levers.

This specification signed and witnessed this 28th day of July A. D. 1908.

PHILIP J. RIVERS.

Witnesses:
W. A. TOWNER, Jr.,
A. BECKER.